(12) United States Patent
Uchida et al.

(10) Patent No.: US 11,826,817 B2
(45) Date of Patent: Nov. 28, 2023

(54) JOINING DEVICE, JOINING METHOD, AND JOINED STRUCTURE

(71) Applicant: TOYOTA JIDOSHA KABUSHIKI KAISHA, Toyota (JP)

(72) Inventors: Keisuke Uchida, Nagoya (JP); Yuya Segawa, Toyota (JP); Satoshi Yamada, Miyoshi (JP); Tomoharu Harada, Toyota (JP); Naoki Nishikawa, Toyota (JP); Hidekatsu Onodera, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/646,199

(22) Filed: Dec. 28, 2021

(65) Prior Publication Data

US 2022/0241843 A1 Aug. 4, 2022

(30) Foreign Application Priority Data

Feb. 2, 2021 (JP) ................. 2021-014870

(51) Int. Cl.
  *B21J 15/10* (2006.01)
  *B21J 15/36* (2006.01)
  *F16B 5/04* (2006.01)

(52) U.S. Cl.
  CPC ............. *B21J 15/36* (2013.01); *F16B 5/04* (2013.01)

(58) Field of Classification Search
  CPC . B21J 15/36; B21J 15/025; B21J 15/00; B21J 15/30; F16B 5/04
  See application file for complete search history.

(56) References Cited

U.S. PATENT DOCUMENTS

| 8,506,228 | B2 | 4/2013 | Singh et al. |
| 9,919,356 | B2 | 3/2018 | Bartig et al. |
| 10,632,523 | B2 | 4/2020 | Henke et al. |
| 2010/0232906 | A1* | 9/2010 | Singh ................ F16B 19/086 411/501 |
| 2015/0121679 | A1* | 5/2015 | Bartig ................ B21J 15/025 29/524.1 |

(Continued)

FOREIGN PATENT DOCUMENTS

| EP | 3 424 611 A1 | 1/2019 |
| EP | 3 608 033 A1 | 2/2020 |

(Continued)

*Primary Examiner* — Jun S Yoo
(74) *Attorney, Agent, or Firm* — Oblon, McClelland, Maier & Neustadt, L.L.P.

(57) ABSTRACT

A joining device comprises a die and driving means. A first concave portion is recessed in a substantially cylindrical shape in a driving direction on the die, and a second concave portion is recessed in the driving direction in a central portion on a bottom face of the first concave portion. A portion on an external side of the second concave portion on the bottom face of the first concave portion forms a terrace portion that is shallower than the second concave portion, and a diameter of the foot portion of the self-piercing rivet corresponds to a diameter of the terrace portion. In driving the foot portion of the self-piercing rivet toward the terrace portion of the first concave portion, the foot portion of the self-piercing rivet is spread outward by the terrace portion and a part of the members to be joined runs into the second concave portion.

5 Claims, 8 Drawing Sheets

(56) References Cited

U.S. PATENT DOCUMENTS

2017/0343027 A1* 11/2017 Wissling .................. B21J 15/36
2020/0156143 A1* 5/2020 Kawasaki ................ B21J 15/36

FOREIGN PATENT DOCUMENTS

| JP | 2002-364617 A | 12/2002 |
| JP | 2005-69451 A | 3/2005 |
| JP | 2018-176236 A | 11/2018 |

* cited by examiner

Fig. 1

CONVENTIONAL          PRESENT EMBODIMENT

JOINING DEVICE, JOINING METHOD, AND JOINED STRUCTURE

CROSS REFERENCE TO RELATED APPLICATIONS

This application is based upon and claims the benefit of priority from Japanese patent application No. 2021-014870, filed on Feb. 2, 2021, the disclosure of which is incorporated herein in its entirety by reference.

BACKGROUND

The present disclosure is related to a joining device, a joining method, and a joined structure, involving joining a plurality of stacked members to be joined by means of a self-piercing rivet.

A joining method has been known including: placing a plurality of stacked members to be joined on a die; and driving a self-piercing rivet into the members to be joined on the die to join the plurality of members to be joined to each other by means of the self-piercing rivet (see, for example, Japanese Unexamined Patent Application Publication No. 2005-069451).

SUMMARY

Incidentally, a die-cast material or the like having undergone a simplified heat treatment is sometimes used as the members to be joined. Such members to be joined have reduced extensibility, and therefore joining by the aforementioned joining method involves a risk of crack development in the member to be joined.

The present disclosure has been made for solving the aforementioned problem, and a principal objective of the present disclosure is to provide a joining device, a joining method, and a joined structure enabling suppression of crack development in the members to be joined.

In order to achieve the aforementioned objective, one aspect of the present disclosure is a joining device comprising:

a die; and driving means configured to drive a substantially cylindrical self-piercing rivet into a plurality of members to be joined placed on the die in a stacked manner, to join the plurality of members to be joined to each other by means of the self-piercing rivet, wherein a first concave portion recessed in a substantially cylindrical shape in a direction of driving the self-piercing rivet is formed on the die, a second concave portion recessed in the direction of driving the self-piercing rivet is formed in a central portion on a bottom face of the first concave portion, a portion on an external side of the second concave portion on the bottom face of the first concave portion forms a terrace portion that is shallower than the second concave portion, a diameter of a foot portion of the self-piercing rivet is defined to correspond to a diameter of the terrace portion, and when the driving means drives the foot portion of the self-piercing rivet toward the terrace portion of the first concave portion, the foot portion of the self-piercing rivet is spread outward by the terrace portion and a part of the members to be joined runs into the second concave portion.

In the present aspect, when a capacity of the first concave portion is DA and a capacity of the second concave portion is DB, the capacity of the first concave portion and the capacity of the second concave portion may be defined to satisfy a relationship of $DB/(DA+DB) \geq 0.1$.

In the present aspect, the self-piercing rivet may comprise the foot portion that gradually tapers down with a first curvature radius from a central region toward a fore end in the direction of driving, and a flange portion that leads from a head face to the foot portion of the self-piercing rivet with a second curvature radius, and the first curvature radius may be greater than the second curvature radius.

In the present aspect, when the capacity of the second concave portion is DB and a capacity of a space inside the foot portion of the self-piercing rivet is RB, the capacity of the second concave portion and the capacity of the space inside the foot portion of the self-piercing rivet may be defined to satisfy a relationship of $RB \geq DB$.

In the present aspect, when the capacity of the first concave portion is DA, the capacity of the second concave portion is DB, the capacity of the space inside the foot portion of the self-piercing rivet is RB, and a volume of the self-piercing rivet is RA, the capacity of the first concave portion, the capacity of the second concave portion, the capacity of the space inside the foot portion of the self-piercing rivet, and the volume of the self-piercing rivet may be defined to satisfy a relationship of $(RA+RB) > (DA+DB)$.

In the present aspect, when a capacity of the first concave portion is DA and a capacity of the second concave portion is DB, the capacity of the first concave portion and the capacity of the second concave portion may be defined to satisfy a relationship of $DB/(DA+DB) \leq 0.25$.

In the present aspect, an inner peripheral face of the first concave portion constitutes a first inclined face that gradually increases in diameter from the bottom face toward an external side, and an inner peripheral face of the second concave portion constitutes a second inclined face that gradually increases in diameter toward the external side.

In order to achieve the aforementioned objective, one aspect of the present disclosure may also be a joining method comprising:

placing a stacked plurality of members to be joined on a die; and driving a substantially cylindrical self-piercing rivet into the members to be joined on the die to join the plurality of members to be joined to each other by means of the self-piercing rivet, wherein a first concave portion recessed in a substantially cylindrical shape in a direction of driving the self-piercing rivet is formed on the die, a second concave portion recessed in the direction of driving the self-piercing rivet is formed in a central portion on a bottom face of the first concave portion, a portion more on an external side than the second concave portion on the bottom face of the first concave portion forms a terrace portion that is shallower than the second concave portion, a diameter of a foot portion of the self-piercing rivet is defined to correspond to a diameter of the terrace portion, and when the foot portion of the self-piercing rivet is driven toward the first concave portion, the foot portion of the self-piercing rivet is spread outward by the terrace portion and a part of the members to be joined runs into the second concave portion.

In order to achieve the aforementioned objective, one aspect of the present disclosure may also be a joined structure obtained by placing a stacked plurality of members to be joined on a die and driving a substantially cylindrical self-piercing rivet into the members to be joined on the die to join the plurality of members to be joined to each other by means of the self-piercing rivet, wherein a first concave portion recessed in a substantially cylindrical shape in a direction of driving the self-piercing rivet is formed on the die, a second concave portion recessed in the direction of driving the self-piercing rivet is formed in a central portion on a bottom face of the first concave portion, a portion on an external side of the second concave portion on the bottom face of the first concave portion forms a terrace portion that is shallower than the second concave portion, a diameter of a foot portion of the self-piercing rivet is defined to correspond to a diameter of the terrace portion, and by driving of the foot portion of the self-piercing rivet toward the first concave portion, the foot portion of the self-piercing rivet is spread outward by the terrace portion and a part of the members to be joined runs into the second concave portion.

According to the present disclosure, a joining device, a joining method, and a joined structure enabling suppression of crack development in the members to be joined can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure is described hereinafter by way of embodiments; however, the disclosure according to the claims is not limited to the following embodiments. In addition, not all configurations described in the embodiments are necessarily essential as means for solving the problem. The following descriptions and the drawings involve omissions and simplifications as appropriate for the sake of clarification of explanation. Note that, in each of the drawings, the same element is denoted by the same symbol and repeated explanation is omitted as needed.

Figure 1:
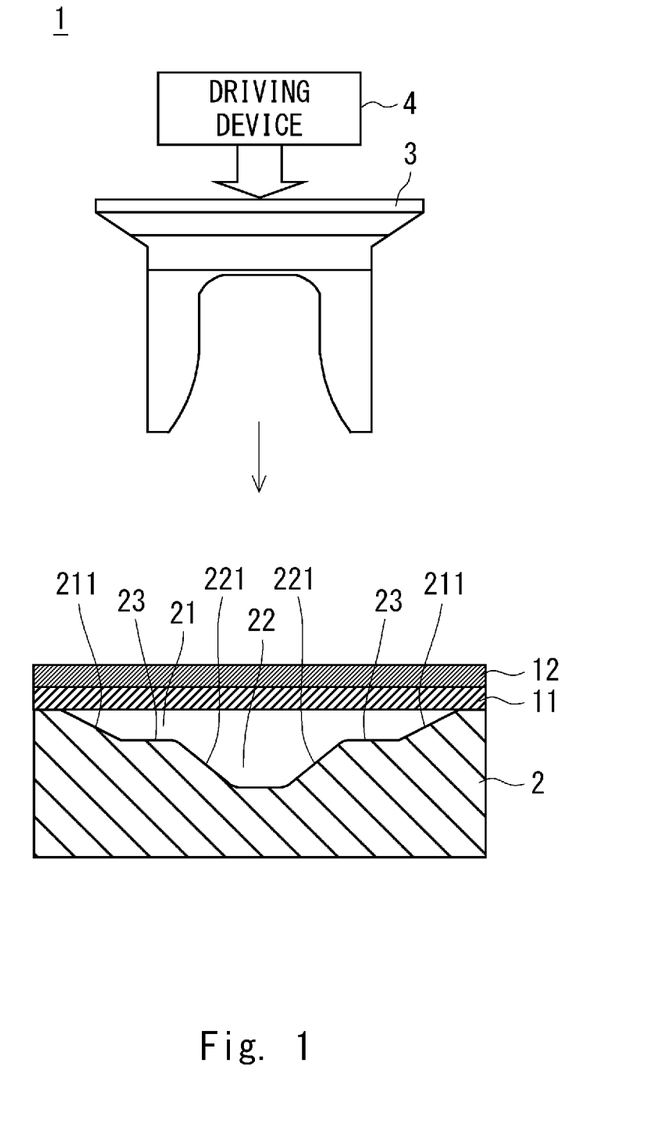
FIG. 1 is a diagram showing a schematic constitution of a joining device according to the present embodiment.

FIG. 1 is a diagram showing a schematic constitution of the joining device according to the present embodiment. A joining device 1 according to the present embodiment joins a plurality of stacked members to be joined by means of a self-piercing rivet (SPR).

The joining device 1 is provided with: a die 2 on which the members to be joined are placed; and a driving device 4 configured to drive the self-piercing rivet 3 into the members to be joined.

On the die 2, a plurality of members to be joined are placed in a stacked manner. For example, a second member to be joined 12 is stacked on a first member to be joined 11. The first member to be joined 11 is a die-cast material having low extensibility, and the second member to be joined 12 is a steel plate. Note that, although two members to be joined are joined in the present embodiment, the present disclosure is not limited thereto and the number of members to be joined may be three or more, and the type of the members to be joined may be arbitrary as well.

The self-piercing rivet 3 is a rivet formed in a substantially cylindrical shape. The self-piercing rivet 3 penetrates the second member to be joined 12 on an upper side, and spreads (interlocks) a foot portion thereof without penetrating the first member to be joined 11 on a lower side, to join the first and second members to be joined 11, 12.

Figure 2:
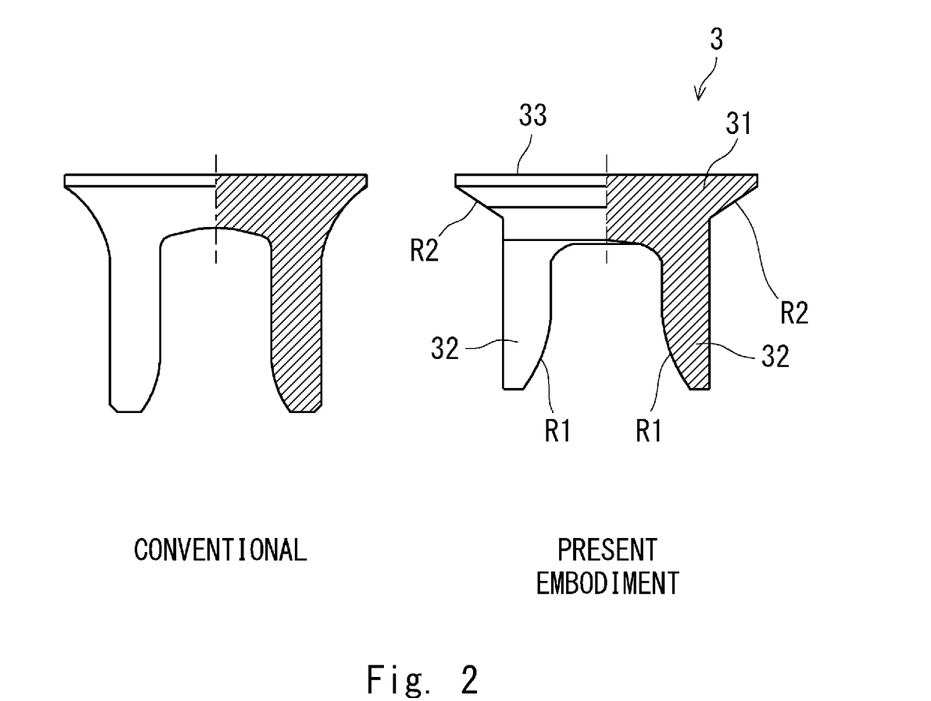
FIG. 2 is a diagram of comparison between a shape of a self-piercing rivet according to the present embodiment and a shape of a conventional self-piercing rivet.

FIG. 2 is a diagram of comparison between a shape of a self-piercing rivet according to the present embodiment and a shape of a conventional self-piercing rivet. In FIG. 2, the self-piercing rivet 3 according to the present embodiment is on the right side and the conventional self-piercing rivet is on the left side.

The self-piercing rivet 3 includes a flange portion 31 and a foot portion 32 connected to the flange portion 31. The flange portion 31 and the foot portion 32 are integrally formed. The foot portion 32 gradually tapers down with a first curvature radius R1 from a central region toward a fore end in the direction of driving. The flange portion 31 leads from a head face 33 to the foot portion 32 with a second curvature radius R2. The first curvature radius R1 is defined to be greater than the second curvature radius R2.

As shown in FIG. 2, in the self-piercing rivet 3 according to the present embodiment, spread of the foot portion 32 is facilitated through the first curvature radius R1 of the foot portion 32 being greater, thus bringing the start position of R closer to the vicinity of the base of the foot portion 32 compared to the conventional self-piercing rivet.

Due to the first curvature radius R1 of the foot portion 32 of the self-piercing rivet 3 being defined to be greater and the foot portion 32 gradually tapering, spread of the foot portion 32 is facilitated upon driving. As a result, joint strength (interlock) is ensured with respect to various members to be joined with different hardness, extensibility, thicknesses, etc., while prevention of buckling of the foot portion 32 is enabled.

On the other hand, due to the second curvature radius R2 of the flange portion 31 of the self-piercing rivet 3 being smaller, a driving load can be lowered, enabling driving of the foot portion 32 deep into, for example, even a hard member to be joined such as a material in the F condition or the T5 condition.

The driving device 4 drives the self-piercing rivet 3 into the first and second members to be joined 11, 12 placed on the die 2 in a stacked manner. This enables the self-piercing rivet 3 to join the first and second members to be joined 11, 12 to each other. The driving device 4 hits the head face 33 of the self-piercing rivet 3 to drive the self-piercing rivet 3 into the first and second members to be joined 11, 12 on the die 2.

Incidentally, simplification of heat treatment of die-cast materials has been increasingly considered for the purpose of reduction of $CO_2$ emission. For example, in the case of using a die-cast material having undergone the simplified heat treatment as the above-described member to be joined, the member to be joined having undergone the simplified heat treatment has reduced extensibility than a heat-treated member to be joined. Therefore, joining with this self-piercing rivet may develop a crack such as a through crack or an inter-plate crack in the member to be joined.

In this regard, in the joining device 1 according to the present embodiment, a first concave portion 21 recessed in a substantially cylindrical shape in a direction of driving the self-piercing rivet 3 is formed on the die 2. A second concave portion 22 recessed in the direction of driving the self-piercing rivet 3 is formed in a central portion on a bottom face of the first concave portion 21. A portion on an external side of the second concave portion 22 on the bottom face of the first concave portion 21 forms a terrace portion 23 that is shallower than the second concave portion 22. A diameter of the foot portion 32 of the self-piercing rivet 3 is defined to correspond to a diameter of the terrace portion 23. For example, the diameter of the foot portion 32 of the self-piercing rivet is defined to be greater than the diameter of the second concave portion 22, smaller than the diameter of the first concave portion 21, and substantially the same as the diameter of the terrace portion 23.

As described above, due to the terrace portion 23 being formed in the first concave portion 21, when the driving device 4 drives the foot portion 32 of the self-piercing rivet 3 toward the terrace portion 23, the first member to be joined 11 is pressed by the fore end of the foot portion 32 of the self-piercing rivet 3 to come into contact with the shallowly positioned terrace portion 23 at an early stage, where the foot portion 32 spreads outward under a reaction force from the terrace portion 23. Therefore, by accelerating a stage where the foot portion 32 of the self-piercing rivet 3 starts spreading, to reduce and disperse the stress applied to the first member to be joined 11, whereby development of a crack in the first member to be joined 11 can be suppressed.

On the other hand, as described above, the second concave portion 22 recessed in the direction of driving the self-piercing rivet 3 is formed in the central portion on the bottom face of the first concave portion 21. When the driving device 4 drives the foot portion 32 of the self-piercing rivet 3 toward the terrace portion 23, the first member to be joined 11 is pressed downward by the fore end of the foot portion 32 of the self-piercing rivet 3, while a part thereof runs into the second concave portion 22. This suppresses an increase in the driving load, whereby buckling of the foot portion 32 of the self-piercing rivet 3 can be prevented.

An inner peripheral face of the first concave portion 21 constitutes a first inclined face 211 that gradually increases in diameter from the bottom face toward an external side. An inner peripheral face of the second concave portion 22 constitutes a second inclined face 221 that gradually increases in diameter toward the external side. Due to constituting the gradual first and second inclined faces 211, 221, the stress concentration on the first member to be joined 11 can be effectively reduced when the self-piercing rivet 3 is driven and the first member to be joined 11 is pressed downward by the fore end of the foot portion 32 of the self-piercing rivet 3.

In addition, due to the external diameter of the first concave portion 21 being made greater, a curvature of deformation of the first member to be joined 11 can be made greater when the self-piercing rivet 3 is driven and the first member to be joined 11 is pressed downward by the fore end of the foot portion 32 of the self-piercing rivet 3, whereby the stress concentration can be reduced. Furthermore, due to the foot portion 32 of the self-piercing rivet 3 being made shorter to correspond to the depth of the terrace portion 23 of the first concave portion 21, buckling of the foot portion 32, and penetration of the foot portion 32 through the first member to be joined 11 can be prevented.

Figure 3:
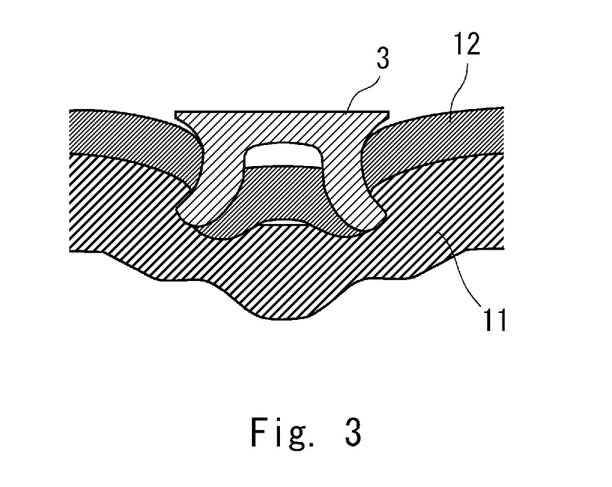
FIG. 3 is a cross-sectional view showing a constitution of a joined structure according to the present embodiment.

FIG. 3 is a cross-sectional view showing a constitution of a joined structure according to the present embodiment. The joining device 1 drives the self-piercing rivet 3 into the first and second members to be joined 11, 12 placed on the die 2 in a stacked manner, to produce a joined structure 10 shown in FIG. 3.

Figure 4:
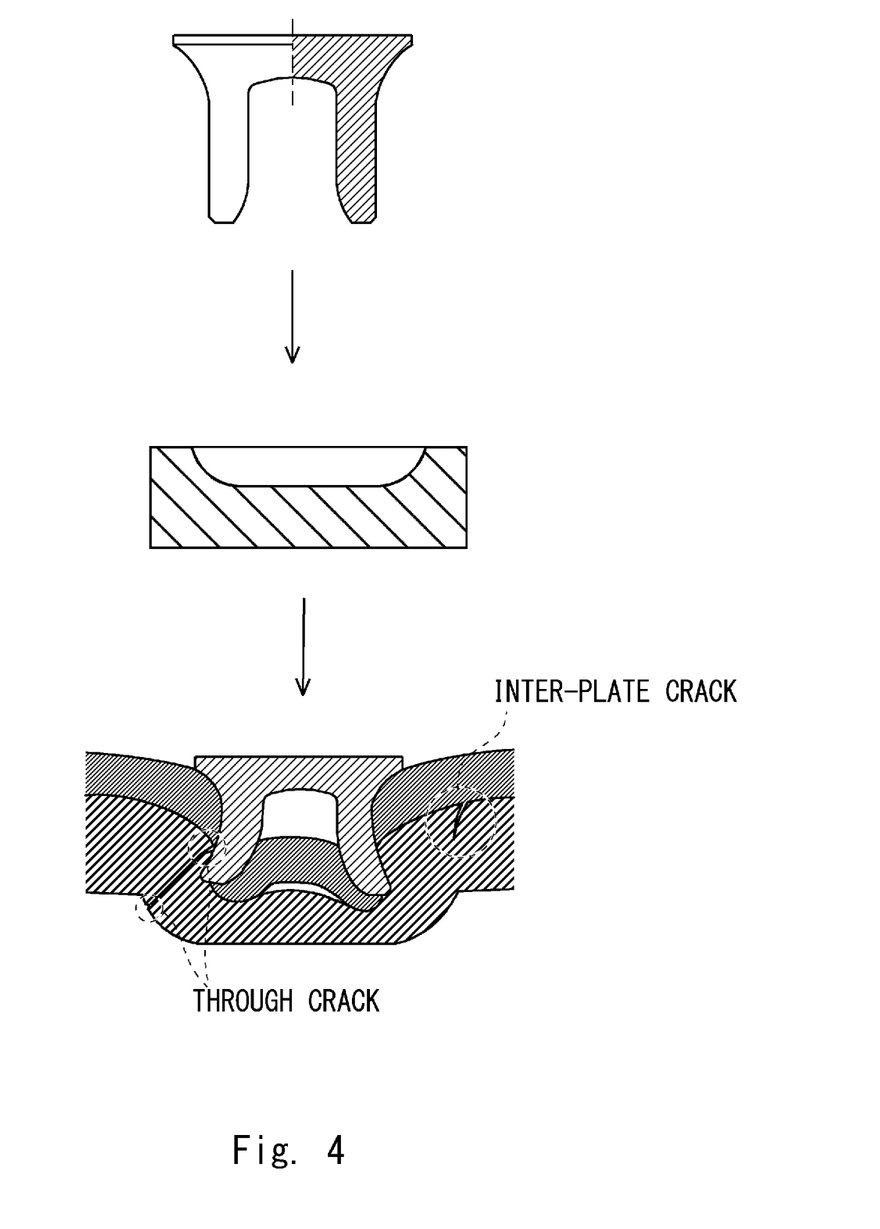
FIG. 4 is a diagram showing a conventional die, a conventional self-piercing rivet, and a conventional joined structure.

In the joined structure 10 according to the present embodiment, a through crack and an inter-plate crack are not developed at all particularly in the first member to be joined 11. On the other hand, as shown in FIG. 4, in a joined structure produced by the die and the self-piercing rivet of the conventional joining device, a through crack and an inter-plate crack are developed in the member to be joined.

Figure 5:
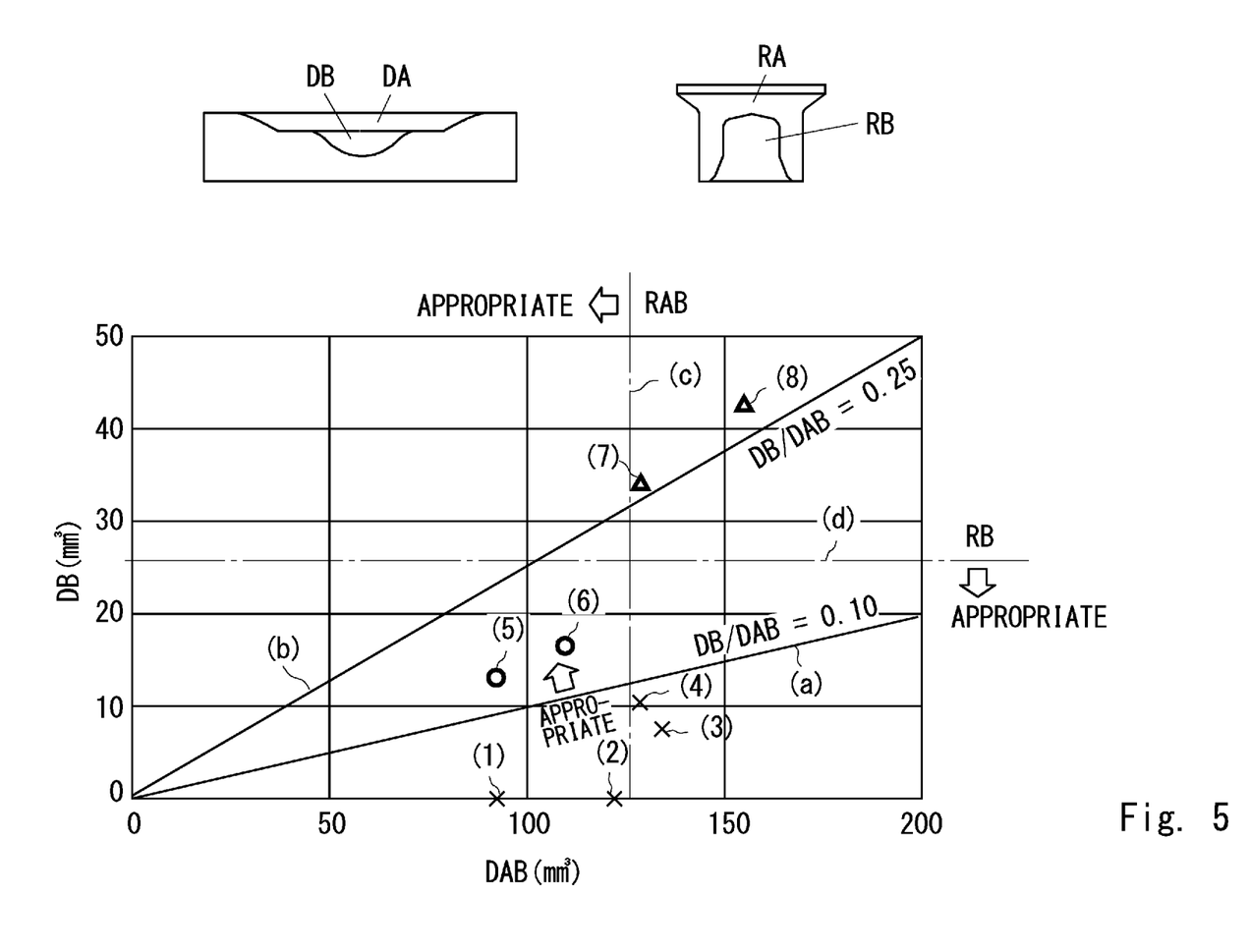
FIG. 5 is a diagram showing a relationship between shapes of first and second concave portions of a die and a self-piercing rivet.

Subsequently, procedures of defining shapes of the first and second concave portions 21, 22 of the die and the self-piercing rivet according to the present embodiment are described in detail. In the present embodiment, the first and second concave portions 21, 22 of the die 2 have different capacities, and the self-piercing rivet 3 is driven into the first and second members to be joined 11, 12 on the die 2.

The first member to be joined 11 is constituted of a die-cast material (ADT10-T5F) of which thickness t is 3.0 mm. The second member to be joined is constituted of a steel plate (SCGA590DU) of which thickness t is 1.6 mm.

FIG. 5 is a diagram showing a relationship between shapes of first and second concave portions of a die and a self-piercing rivet. Note that in FIG. 5, the capacity of the first concave portion 21 is referred to as DA $mm^3$, the capacity of the second concave portion 22 is referred to as DB $mm^3$, and a total capacity of the first concave portion 21 and the second concave portion 22 (DA+DB) is referred to as DAB $mm^3$. The volume of the self-piercing rivet 3 is referred to as RA $mm^3$, the capacity of the space inside the foot portion 32 of the self-piercing rivet 3 (spatial capacity) is referred to as RB $mm^3$, and a total volume of the self-piercing rivet including the spatial capacity (RA+RB) is referred to as RAB $mm^3$.

In FIG. 5, the ordinate represents the capacity DB of the second concave portion 22, and the abscissa represents the capacity DAB of the first and second concave portions 21, 22. Each coordinate point in the coordinate system of FIG. 5 represents (DAB, DA).

In FIG. 5, at the coordinate points (1) and (3) showing the symbol "x", the foot portion 32 of the self-piercing rivet 3 is buckled. At the coordinate points (2) and (4) showing the symbol "x", a crack is developed in the first member to be joined 11. On the other hand, at the coordinate points (5) and (6) showing the symbol "o" above the line (a), no buckling of the foot portion 32 of the self-piercing rivet 3 is generated and no crack is developed in the first member to be joined 11, indicating that these coordinate points are appropriate.

Therefore, in order to suppress buckling of the foot portion 32 of the self-piercing rivet 3 and a crack in the first member to be joined 11, it is preferred to define the respective capacities of the first and second concave portions 21, 22 such that the coordinate point (DAB, DA) is positioned in a range above the line (a). Since a slope of the line (a) is evaluated to be 0.1, it is preferred to define the capacities of the first and second concave portions 21, 22 to satisfy a relationship of DB/DAB≥0.1.

Due to such definitions, even in a case of small DA (shallow depth) for suppression of a crack in the first member to be joined 11, a sufficient space can be secured in the second concave portion 22 into which the first member to be joined 11 runs, whereby buckling of the foot portion 32 of the self-piercing rivet 3 can be suppressed.

In addition, at the coordinate points (7) and (8) showing the symbol "Δ", although no buckling of the foot portion 32 of the self-piercing rivet 3 is generated and no crack is developed in the first member to be joined 11, the spread of the foot portion 32 of the self-piercing rivet 3 is little, causing interlock deficiency. On the other hand, at the coordinate points (5) and (6) showing the symbol "○" below the line (b), the spread of the foot portion 32 of the self-piercing rivet 3 is sufficient and no interlock deficiency is caused, indicating that these coordinate points are appropriate.

Therefore, in order to suppress interlock deficiency of the self-piercing rivet 3, it is preferred that the coordinate point (DAB, DA) is positioned in a range below the line (b). Since a slope of the line (b) is evaluated to be 0.25, it is preferred to define the capacities of the first and second concave portions 21, 22 to satisfy a relationship of DB/DAB≤0.25.

Due to such definitions, the amount of the first member to be joined 11 running into the second concave portion 22 is limited, whereby reduction in pressure applied to the foot portion 32 of the self-piercing rivet 3 can be suppressed and interlock deficiency can be suppressed.

Given the foregoing, in order to suppress interlock deficiency of the foot portion 32 of the self-piercing rivet 3 while suppressing buckling of the foot portion 32 of the self-piercing rivet 3 and development of a crack in the first member to be joined 11, it is more preferred to define the respective capacities of the first and second concave portions 21, 22 of the die 2 to satisfy a relationship of 0.1≤DB/DAB≤0.25.

Furthermore, as described above, at the coordinate points (7) and (8) showing the symbol "Δ", interlock deficiency is caused in the foot portion 32 of the self-piercing rivet 3. On the other hand, at the coordinate points (5) and (6) showing the symbol "○" smaller than the line (c), no interlock deficiency is caused in the foot portion 32 of the self-piercing rivet 3, indicating that these coordinate points are appropriate.

Therefore, in order to suppress interlock deficiency of the self-piercing rivet 3, it is preferred that the coordinate point (DAB, DA) is positioned in a range smaller than the line (c). Since the line (c) represents RAB, it is preferred to define the capacities of the first and second concave portions 21, 22, and the volume and the spatial capacity of the self-piercing rivet 3 to satisfy a relationship of DAB≤RAB.

Due to such definitions, the foot portion 32 of the self-piercing rivet 3 can be spread while an appropriate pressure is applied to the foot portion 32 to suppress interlock deficiency.

Similarly, as described above, at the coordinate points (7) and (8) showing the symbol "Δ", interlock deficiency is caused in the foot portion 32 of the self-piercing rivet 3. On the other hand, at the coordinate points (5) and (6) showing the symbol "○" smaller than the line (d), no interlock deficiency is caused in the foot portion 32 of the self-piercing rivet 3, indicating that these coordinate points are appropriate.

Therefore, in order to suppress interlock deficiency of the self-piercing rivet 3, it is preferred that the coordinate point (DAB, DA) is positioned in a range smaller than the line (d). Since the line (d) represents RB, it is preferred to define the capacity of the second concave portion 22 and the spatial capacity of the self-piercing rivet 3 to satisfy a relationship of DB≤RB.

Due to such definitions, reduction in pressure applied to the foot portion 32 of the self-piercing rivet can be suppressed while the amount of the first member to be joined 11 running into the second concave portion 22 is limited, and interlock deficiency can be suppressed.

Figure 6:
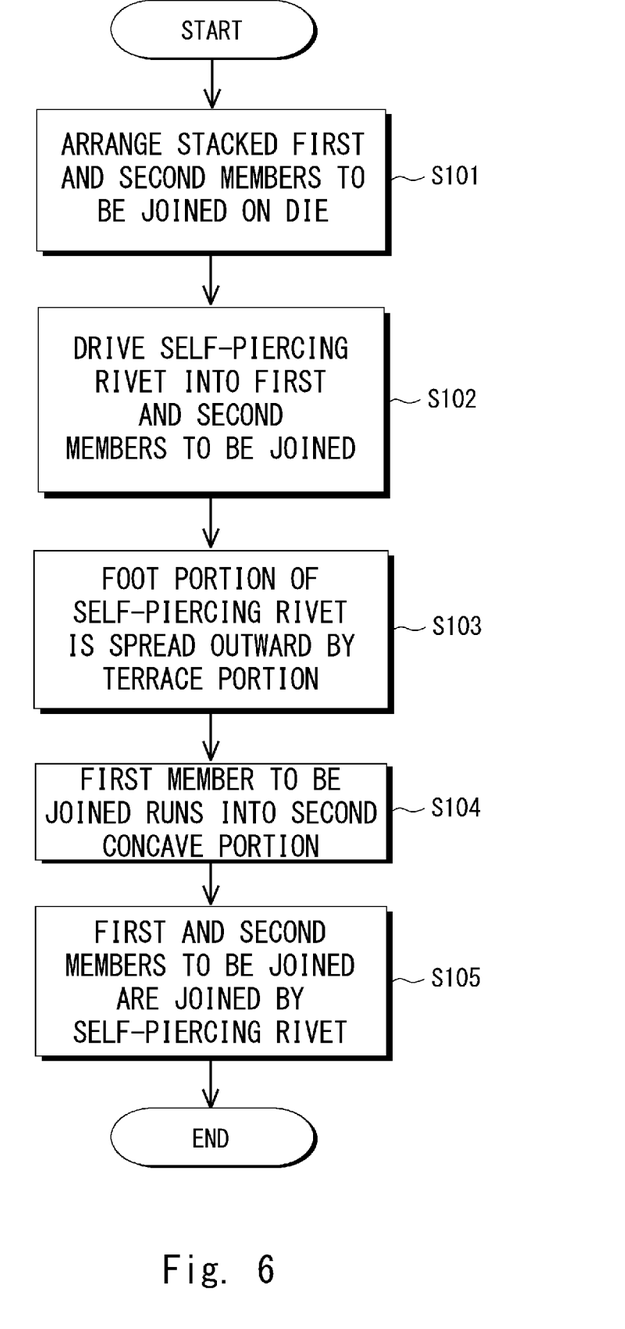
FIG. 6 is a flow chart showing a joining method according to the present embodiment.

Subsequently, the joining method according to the present embodiment is described. FIG. 6 is a flow chart showing the joining method according to the present embodiment.

First, the first and second members to be joined 11, 12 being stacked are placed on the die 2 (Step S101). The driving device 4 drives the self-piercing rivet 3 into the first and second members to be joined 11, 12 on the die 2 (Step S102). As a result, the foot portion 32 of the self-piercing rivet 3 is spread outward by the terrace portion 23 of the first concave portion 21 of the die 2 (Step S103), and a part of the first member to be joined 11 runs into the second concave portion 22 (Step S104). The first and second members to be joined 11, 12 are joined by the self-piercing rivet 3 (Step S105).

Figure 7:
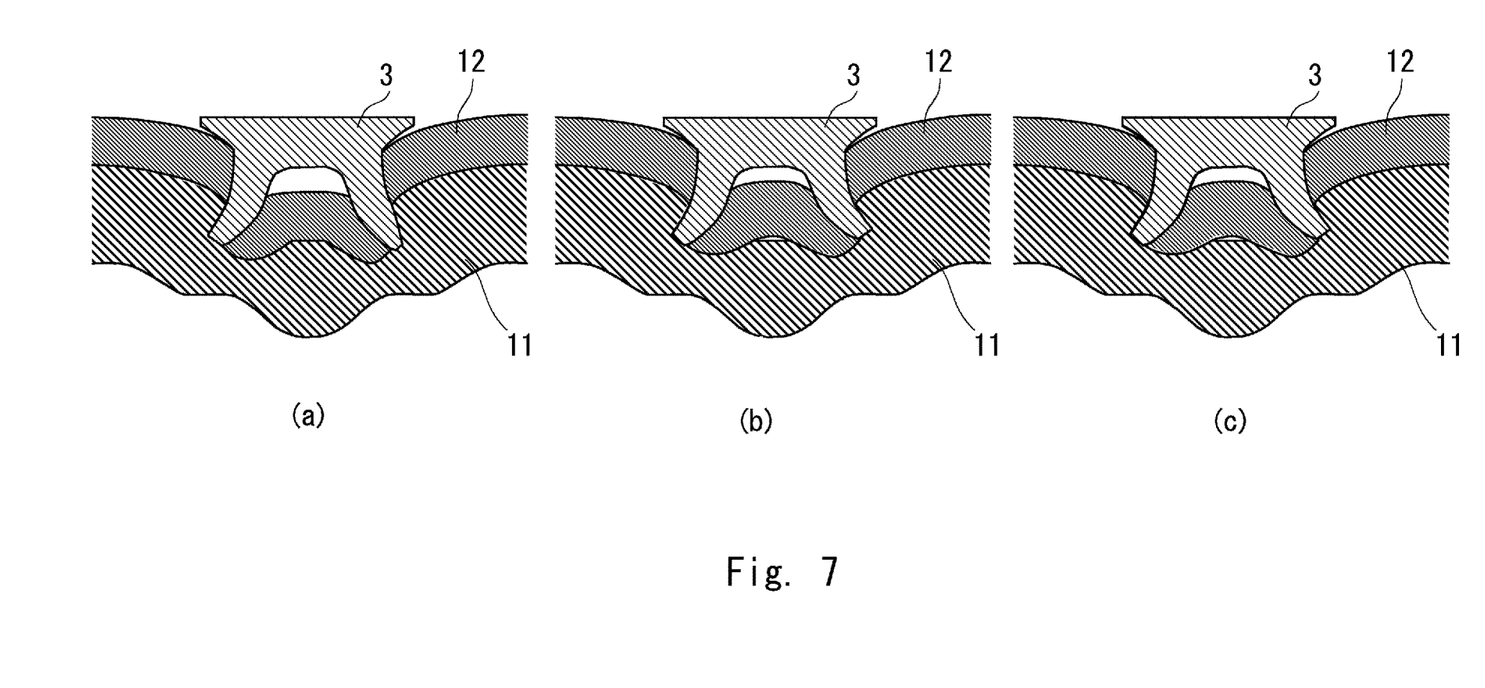
FIG. 7 is a diagram showing results of joining of first and second members to be joined.

Subsequently, results of joining of the hard first member to be joined 11 and the second member to be joined 12 by using the joining device 1 according to the present embodiment are described. FIG. 7 is a diagram showing results of joining of the first and second members to be joined.

In FIG. 7, (a) shows a result of joining in a case in which the Vickers hardness of the first member to be joined 11 is about 70 HV, (b) shows a result of joining in a case in which the Vickers hardness of the first member to be joined 11 is about 80 HV, and (c) shows a result of joining in a case in which the Vickers hardness of the first member to be joined 11 is 90 HV or greater.

As shown in FIG. 7, as a result of joining the hard first member to be joined 11 and the second member to be joined 12, no crack is developed in the first member to be joined 11 of any hardness of (a), (b) and (c). It can thus be observed that the joining device 1 according to the present embodiment enables suppression of a crack in the first member to be joined 11, even when the hard first member to be joined 11 is employed.

Furthermore, results of joining of the first and second members to be joined 11, 12 by using the joining device 1 according to the present embodiment, with different extensibilities of the first member to be joined 11 and different types of the second member to be joined 12, are described.

Figure 8:
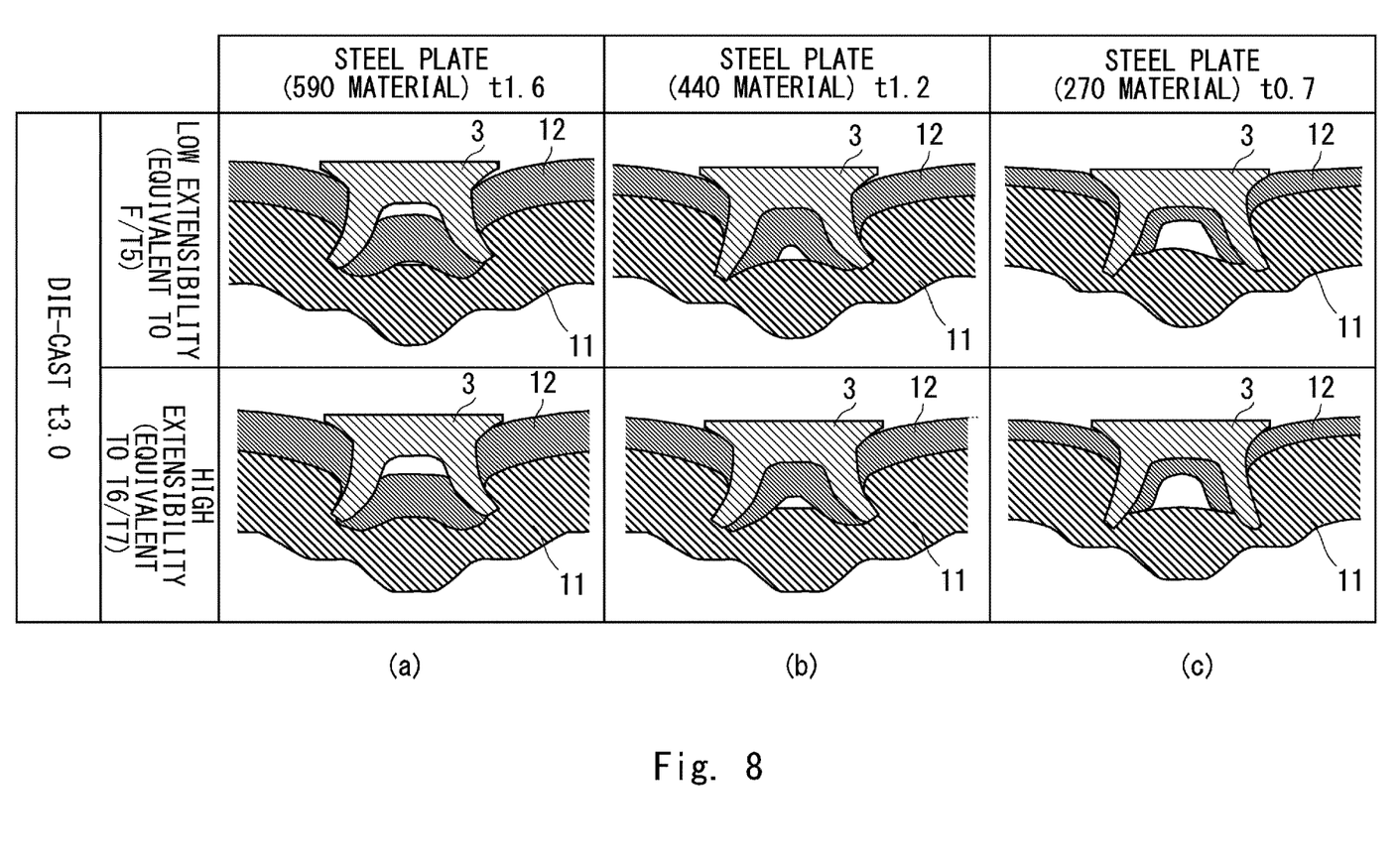
FIG. 8 is a diagram showing results of joining of first and second members to be joined.

FIG. 8 is a diagram showing results of joining of the first and second members to be joined. In FIG. 8, (a) shows a result of joining in a case in which the second member to be joined 12 is a steel plate of which thickness t is 1.6 mm (590 material), (b) shows a result of joining in a case in which the second member to be joined 12 is a steel plate of which thickness t is 1.2 mm (440 material), and (c) shows a result of joining in a case in which the second member to be joined 12 is a steel plate of which thickness t is 0.7 mm (270 material).

In addition, in FIG. 8, the lower part shows results of joining in a case in which the first member to be joined 11 is a high-extensibility die-cast material of which thickness t is 3.0 mm having undergone the T6/T7 heat treatment, and the upper part shows results of joining in a case in which the first member to be joined 11 is a low-extensibility die-cast material of which thickness t is 3.0 mm having undergone the F/T5 heat treatment.

As shown in FIG. 8, as a result of joining the first and second members to be joined 11, 12 with various extensibilities of the first member to be joined 11 and various types of the second member to be joined 12, no crack is developed in the first member to be joined 11 of any of (a), (b) and (c). It can thus be observed that the joining device 1 according to the present embodiment enables suppression of a crack in the first member to be joined 11, even when various types of the first and second members to be joined 11, 12 are employed.

As described in the foregoing, in the joining device 1 according to the present embodiment, a first concave portion 21 recessed in a substantially cylindrical shape in a direction of driving the self-piercing rivet 3 is formed on the die 2. A second concave portion 22 recessed in the direction of driving the self-piercing rivet 3 is formed in a central portion on a bottom face of the first concave portion 21. A portion on an external side of the second concave portion 22 on the bottom face of the first concave portion 21 forms a terrace portion 23 that is shallower than the second concave portion 22. A diameter of the foot portion 32 of the self-piercing rivet 3 is defined to correspond to a diameter of the terrace portion 23. When the driving device 4 drives the foot portion 32 of the self-piercing rivet 3 toward the terrace portion 23 of the first concave portion 21, the foot portion 32 of the self-piercing rivet 3 is spread outward by the terrace portion 23 and a part of the members to be joined runs into the second concave portion 22.

Due to forming the terrace portion 23 in the first concave portion 21, when the foot portion 32 of the self-piercing rivet is driven toward the terrace portion 23, a stage where the foot portion 32 of the self-piercing rivet 3 starts spreading is accelerated and the stress applied to the first member to be joined 11 is reduced, whereby development of a crack in the first member to be joined 11 can be suppressed. On the other hand, due to forming the second concave portion 22 in the central portion on the bottom face of the first concave portion 21, when the foot portion 32 of the self-piercing rivet 3 is driven toward the terrace portion 23, a part of the first member to be joined 11 runs into the second concave portion 22, whereby buckling of the foot portion 32 of the self-piercing rivet 3 can be prevented.

Although some embodiments of the present disclosure have been described, these embodiments are by way of example only, and are not intended to limit the scope of the disclosure. These novel embodiments may be carried out in various other modes, and various omissions, replacements, and changes can be made without departing from the spirit of the disclosure. These embodiments and modifications thereof are encompassed in the scope and spirit of the disclosure, as well as the scope of the disclosure according to the claims and its equivalent.

Figure 9:
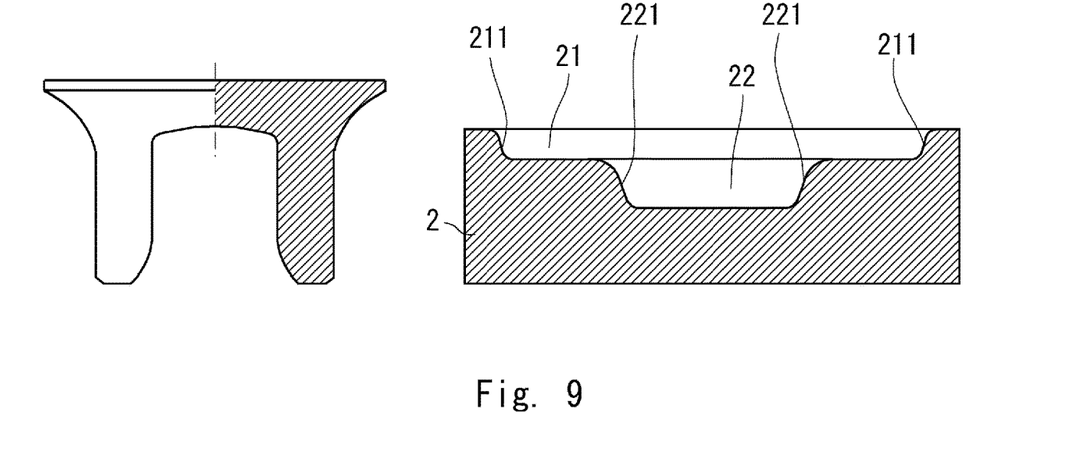
FIG. 9 is a diagram showing a die and a self-piercing rivet according to another embodiment.

For example, in the present embodiment, a conventional self-piercing rivet may also be used as the self-piercing rivet as shown in FIG. 9. In FIG. 9, the self-piercing rivet is on the left side and the die 2 is on the right side. The first inclined face 211 of inner peripheral face of the first concave portion 21 and the second inclined face 221 of inner peripheral face of the second concave portion 22 of the die 2 may be steeper than in the above-described embodiments.

Figure 10:
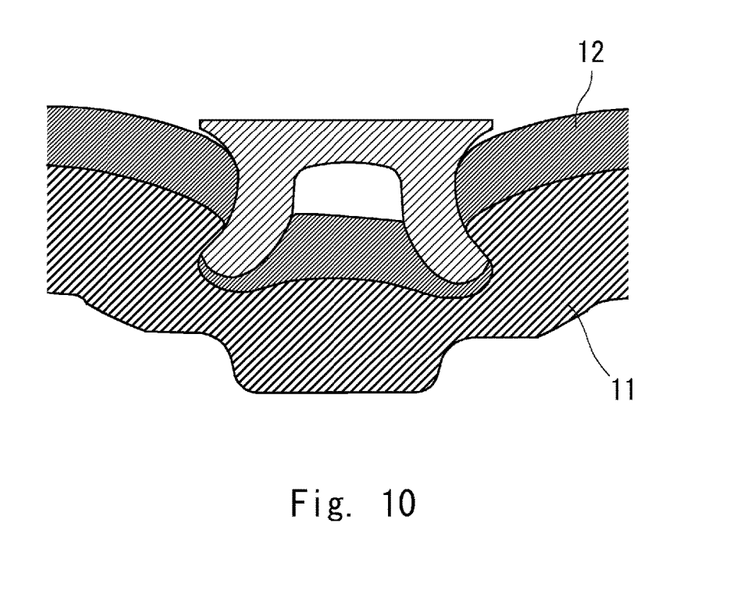
FIG. 10 is a diagram showing a joined structure produced by using the self-piercing rivet and the die according to the another embodiment.

FIG. 10 is a diagram showing a joined structure produced by using the above-described self-piercing rivet and the die.

As shown in FIG. 10, it can thus be observed that suppression of interlock deficiency in the foot portion of the self-piercing rivet is enabled, while buckling of the foot portion of the self-piercing rivet and development of a crack in the first member to be joined 11 are suppressed.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A joining device comprising:
a die; and
a rivet driver, wherein
a first concave portion recessed in a substantially cylindrical shape in a direction of driving a self-piercing rivet is formed on the die,
a second concave portion recessed in the direction of driving the self-piercing rivet is formed in a central portion on a bottom face of the first concave portion,
a portion on an external side of the second concave portion on the bottom face of the first concave portion forms a terrace portion that is shallower than the second concave portion,
a diameter of a foot portion of the self-piercing rivet is defined to correspond to a diameter of the terrace portion, and
when the rivet driver drives the foot portion of the self-piercing rivet toward the terrace portion of the first concave portion, the foot portion of the self-piercing rivet is spread outward by the terrace portion and a part of the members to be joined runs into the second concave portion,
wherein, when a capacity of the first concave portion is DA and a capacity of the second concave portion is DB, the capacity of the first concave portion and the capacity of the second concave portion are defined to satisfy a relationship of $0.1 \leq DB/(DA+DB) \leq 0.25$.

2. The joining device according to claim 1, wherein
the self-piercing rivet comprises the foot portion that gradually tapers down with a first curvature radius from a central region toward a fore end in the direction of driving, and a flange portion that leads from a head face to the foot portion of the self-piercing rivet with a second curvature radius, and
the first curvature radius is greater than the second curvature radius.

3. The joining device according to claim 1, wherein
when the capacity of the second concave portion is DB and a capacity of a space inside the foot portion of the self-piercing rivet is RB,
the capacity of the second concave portion and the capacity of the space inside the foot portion of the self-piercing rivet are defined to satisfy a relationship of $RB \geq DB$.

4. The joining device according to claim 1, wherein
the capacity of the space inside the foot portion of the self-piercing rivet is RB, and a volume of the self-piercing rivet is RA,
the capacity of the first concave portion, the capacity of the second concave portion, the capacity of the space inside the foot portion of the self-piercing rivet, and the volume of the self-piercing rivet are defined to satisfy a relationship of $(RA+RB)>(DA+DB)$.

5. The joining device according to claim 1, wherein
an inner peripheral face of the first concave portion constitutes a first inclined face that gradually increases in diameter from the bottom face toward an external side, and
an inner peripheral face of the second concave portion constitutes a second inclined face that gradually increases in diameter toward the external side.

\* \* \* \* \*